(12) United States Patent
Wood

(10) Patent No.: US 7,799,450 B2
(45) Date of Patent: *Sep. 21, 2010

(54) WATER VAPOR TRANSPORT POWER GENERATOR

(75) Inventor: Roland A. Wood, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/191,233

(22) Filed: Aug. 13, 2008

(65) Prior Publication Data

US 2008/0305372 A1 Dec. 11, 2008

Related U.S. Application Data

(60) Continuation of application No. 11/247,435, filed on Oct. 11, 2005, now Pat. No. 7,455,924, which is a division of application No. 09/941,247, filed on Aug. 28, 2001, now Pat. No. 7,001,681.

(51) Int. Cl.
*H01M 8/06* (2006.01)
(52) U.S. Cl. .......................................... 429/19; 429/17
(58) Field of Classification Search ........................ None
See application file for complete search history.

(56) References Cited

U.S. PATENT DOCUMENTS

| | | | |
|---|---|---|---|
| 3,133,837 A | 5/1964 | Eidensohn et al. | |
| 4,055,632 A | 10/1977 | Hoffman et al. | |
| 4,155,712 A | 5/1979 | Taschek | |
| 4,261,955 A | 4/1981 | Bailey, Jr. et al. | |
| 5,372,617 A | 12/1994 | Kerrebrock et al. | |
| 5,804,329 A | 9/1998 | Amendola | |
| 5,836,750 A | 11/1998 | Cabuz | |
| 5,942,344 A | 8/1999 | Lehmeier et al. | |
| 6,093,501 A | 7/2000 | Werth | |
| 6,250,078 B1 | 6/2001 | Amendola | |
| 6,358,488 B1 | 3/2002 | Suda | |
| 7,001,681 B2 | 2/2006 | Wood | |

(Continued)

FOREIGN PATENT DOCUMENTS

DE 19734259 A1 2/1999

(Continued)

OTHER PUBLICATIONS

"U.S. Appl. No. 10/780,827, Non-Final Office Action mailed Jan. 30, 2008", OARN, 3 pgs.

(Continued)

*Primary Examiner*—Jonathan Crepeau
(74) *Attorney, Agent, or Firm*—Schwegman, Lundberg & Woessner, P.A.

(57) ABSTRACT

An improved system for generating electrical power using a fuel cell. More particularly, a system for generating hydrogen gas by reacting water vapor with a substantially non-fluid substance and transporting the generated hydrogen gas to the fuel cell which generates electrical power. Reacting water vapor with the non-fluid hydrogen generating substance rather than liquid water prevents caking of the non-fluid substance and deposition of byproducts onto the non-fluid substance that interfere with continued generation of hydrogen gas.

17 Claims, 2 Drawing Sheets

U.S. PATENT DOCUMENTS

| | | | |
|---|---|---|---|
| 7,445,860 B2 * | 11/2008 | Rezachek et al. | 429/19 |
| 7,455,924 B2 * | 11/2008 | Wood | 429/19 |
| 2001/0022960 A1 | 9/2001 | Kojima et al. | |
| 2001/0045364 A1 | 11/2001 | Hockaday et al. | |
| 2003/0044656 A1 | 3/2003 | Wood | |
| 2003/0138685 A1 | 7/2003 | Jankowski et al. | |
| 2006/0040152 A1 | 2/2006 | Wood | |

FOREIGN PATENT DOCUMENTS

| | | |
|---|---|---|
| GB | 723180 A1 | 2/1955 |
| WO | WO-0185606 A1 | 11/2001 |
| WO | WO-03020635 A2 | 3/2003 |

OTHER PUBLICATIONS

"U.S. Appl. No. 10/780,827, Notice of Allowance mailed Jun. 6, 2008", NOAR, 7 pgs.

"U.S. Appl. No. 10/780,827, Amendment and Response filed Jan. 15, 2008 to Final Office Action mailed Oct. 16, 2007", 12.

"U.S. Appl. No. 10/780,827, Amendment and Response filed Apr. 7, 2008 to Office Action mailed Jan. 30, 2008", 10.

"U.S. Appl. No. 11/247,435, Response filed Jul. 10, 2008 to final Office Action mailed Mar. 17, 2008", 6.

"U.S. Appl. No. 11/247,435, Response filed May 15, 2008 to Final Office Action mailed Mar. 17, 2008", 11.

"U.S. Appl. No. 11/247,435 Final Office Action mailed Mar. 17, 2008", FOAR, 10 Pgs.

"Non-Final Office Action Mailed Sep. 28, 2007 in U.S. Appl. No. 11/247,435", OARN, 11 pgs.

Aiello, R., et al., "Production of Hydrogen From chemical Hydrides Via Hydrolysis With Steam", *International Journal of Hydrogen Energy*, vol. 24, (1999), 1123-1130.

Amendola, S. C., et al., "A Novel High Power Density Borohydride-Air Cell", *Electrochemical Society Proceedings*; Abstract; vol. 98-15, (Nov. 1, 1998), 47-54.

Amendola, S. C., et al., "A safe, portable, hydrogen gas generator using aqueous borohydride solution and Ru catalyst", *International Journal of Hydrogen Energy*, vol. 25, No. 10, (Oct. 2000), 969-975.

Amendola, S. C., et al., "An Ultrasafe Hydrogen Generator: Aqueous, Alkaline Borohydride Solutins and Ru Catalyst", *Abstract; Journal of Power Sources*, vol. 85, No. 2, (Feb. 2000), 186-189.

"U.S. Appl. No. 12/231,363 Response Filed May 27, 2009 to Restriction Requirement Mailed May 5, 2009", 7.

"U.S. Appl. No. 11/247,435, Notice of Allowance mailed Aug. 8, 2008", NOAR, 6 pgs.

"U.S. Appl. No. 12/231,363, Response filed Oct. 7, 2009 to Non Final Office Action mailed Aug. 25, 2009", 12 pgs.

"U.S. Appl. No. 12/231,363, Non-Final Office Action mailed Aug. 25, 2009", 16 Pgs.

"U.S. Appl. No. 12/231,363, Notice of Allowance mailed Mar. 16, 2010", 7.

"Application Serial No. 2003-524908, Office Action Received mailed Apr. 27, 2009", 48.

"U.S. Appl. No. 12/231,363, Notice of Allowance mailed Mar. 16, 2010", 6 pgs.

"European Application No. 02770436.0, Office Action Mailed Jan. 15, 2010", 6.

* cited by examiner

WATER VAPOR TRANSPORT POWER GENERATOR

CROSS REFERENCE TO RELATED APPLICATIONS

This application is a continuation of U.S. patent application Ser. No. 11/247,435 filed Oct. 11, 2005, now U.S. Pat. No. 7,455,924, which is a division of U.S. patent application Ser. No. 09/941,247 filed Aug. 28, 2001, now U.S. Pat. No. 7,001,681.

BACKGROUND OF THE INVENTION

1. Field of the Invention

The invention relates to an improved system for generating electrical power using a fuel cell. More particularly, the invention pertains to a system for generating hydrogen gas by reacting water vapor with a substantially non-fluid substance and transporting the generated hydrogen gas to the fuel cell which in turn generates electrical power.

2. Description of the Related Art

Similar to batteries, fuel cells function to produce electric power through chemical reactions. Rather than storing reactants as batteries do, fuel cells are operated by continuously supplying reactants to the cell. In a typical fuel cell, hydrogen gas acts as one reactant and oxygen as the other, with the two reacting at electrodes to form water molecules and releasing energy in the form of direct current electricity. This direct current electricity may then be converted into an alternating current. The system may produce electricity continuously as long as hydrogen and oxygen are provided. While oxygen is typically provided from the air, it is generally necessary to generate hydrogen gas from other compounds through controlled chemical reactions rather than storing hydrogen, because storing of hydrogen gas requires that it either be compressed or cryogenically cooled. As fuel cell technology evolves, so do the means by which hydrogen gas is generated for application with fuel cells.

Currently, there are various methods which are known and employed for generating hydrogen gas. The predominant method is by a process known as reformation in which fossil fuels are broken down into their hydrogen and carbon products. However, this system is undesirable in the long term because it is dependent upon a non-renewable resource. Another method is electrolysis, in which hydrogen is split from water molecules. However, this method is not well suited for large scale applications, such as use in automobiles. Another means of generating hydrogen gas is by reversibly adsorbing and releasing hydrogen gas from metal hydrides or alloys through heating. While this method is useful, it is not preferred because the metal hydrides are typically very heavy, expensive and only release small quantities of hydrogen. Yet another means by which hydrogen gas is generated is through reactive chemical hydrides. This process involves chemically generating hydrogen gas from dry, highly reactive solids by reacting them with liquid water or acids. Chemicals especially suitable for this process are lithium hydride, calcium hydride, lithium aluminum hydride and sodium borohydride, each of which are capable of releasing plentiful quantities of hydrogen. The disadvantages associated with this method is that reaction products from the chemical and liquid water typically form a cake or pasty substance which interferes with further reaction of the reactive chemical with the liquid water or acid.

It is of great interest in the art to provide a means by which hydrogen gas may be generated for use in fuel cells, without relying on non-renewable resources and without the disadvantages of each of the aforementioned methods. The present invention provides a solution to this problem. The invention provides an electrical power generator and a process for generating hydrogen gas for fueling a fuel cell. The electrical power generator comprises a water vapor generator at least partially filled with water vapor, at least one hydrogen gas generator connected to the water vapor generator, and a fuel cell connected to the hydrogen gas generator, the hydrogen generation chamber being at least partially filled with a substantially non-fluid substance which reacts with water vapor to generate hydrogen gas. The hydrogen gas generated may then be used as a "fuel" which allows the fuel cell to generate electrical power. The present invention improves upon the related art by reacting a water vapor with a substantially non-fluid substance to generate hydrogen gas rather than liquid water. By reacting a water vapor with the aforementioned non-fluid chemical substance, it has been found that the typical problems associated with reactive chemical hydrides are avoided, resulting in a more efficient system than those of the prior art.

SUMMARY OF THE INVENTION

The invention provides an electrical power generator comprising:

a) a water vapor generator;

b) a hydrogen gas generator attached to the water vapor generator, said hydrogen generator containing a substantially non-fluid substance which reacts with water vapor to generate hydrogen gas; said hydrogen generator optionally being attached to said water vapor generator via at least one conduit; and c) a fuel cell attached to the hydrogen gas generator; said fuel cell optionally being attached to said hydrogen gas generator via at least one conduit.

The invention also provides a process for generating hydrogen gas for fueling a fuel cell comprising:

a) directing water vapor from a water vapor generator to a hydrogen generator, said hydrogen generator being at least partially filled with a substantially non-fluid substance which reacts with water vapor to generate hydrogen gas; and b) directing hydrogen gas and any residual water vapor from the hydrogen generator to a fuel cell.

The invention further provides an improved process for generating electrical energy wherein water and hydrogen gas are directed from a water containing chamber to a fuel cell; and water and any residual hydrogen gas are directed from the fuel cell back to the water containing chamber; and water and hydrogen gas are directed through a hydrogen gas generator, which hydrogen gas generator is connected to each of the fuel cell and water containing chamber and which hydrogen gas generator is at least partially filled with a substance which reacts with water to generate hydrogen gas, wherein the improvement comprises contacting water in the form of water vapor with a substantially non-fluid substance which reacts with water vapor to generate hydrogen gas.

DETAILED DESCRIPTION OF THE PREFERRED EMBODIMENTS

An electrical power generator is provided which generates hydrogen gas through controlled reactions of water vapor with a substantially non-fluid substance, which hydrogen gas is then used to fuel a fuel cell. The electrical energy generated may be used to power miniature devices such as cellular phones or other hand held electronic devices, and ultimately may be suitable for use in larger scale systems such as fuel driven equipment and automobiles.

Figure 1:
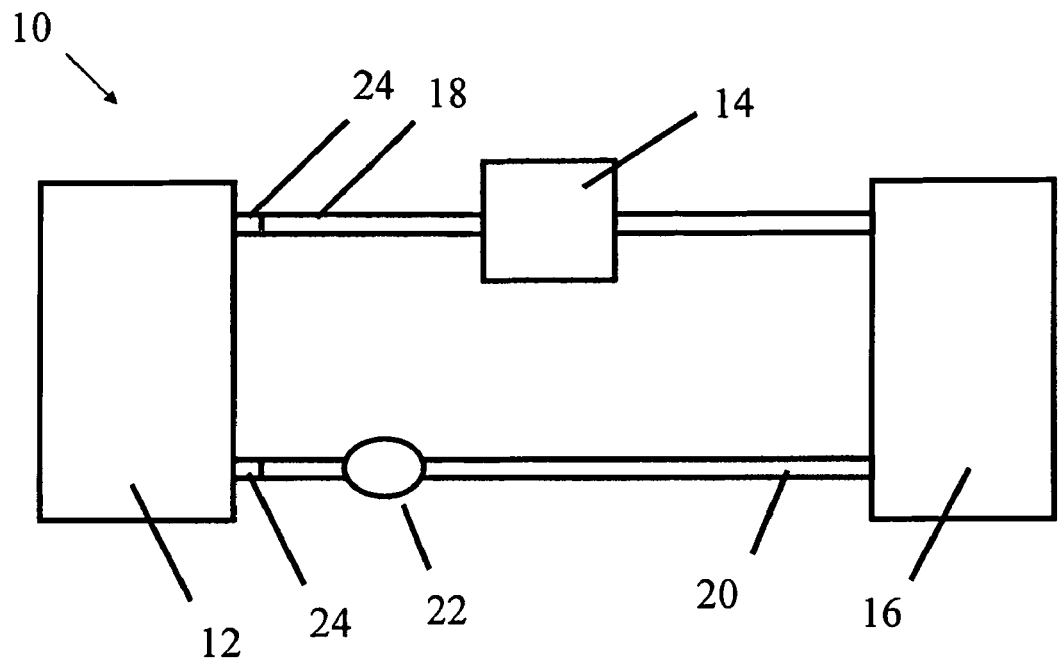
FIG. 1 is a schematic representation of an electrical power generator having a conduit and a separate return line.
Figure 2:
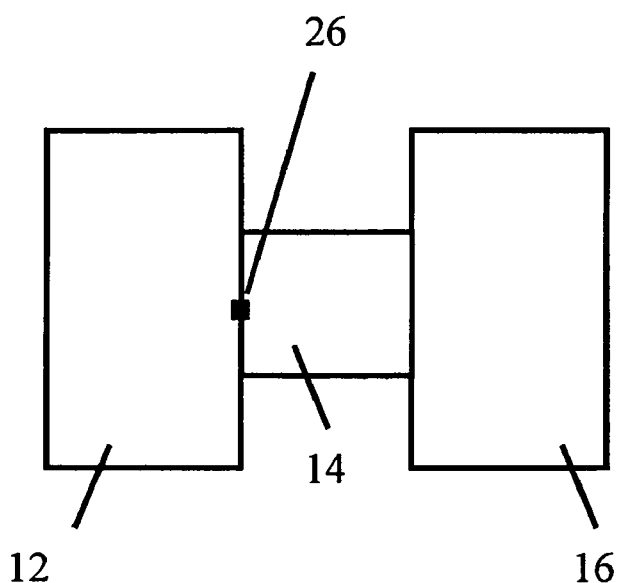
FIG. 2 is a schematic representation of an electrical power generator having neither a conduit nor a return line.
Figure 3:
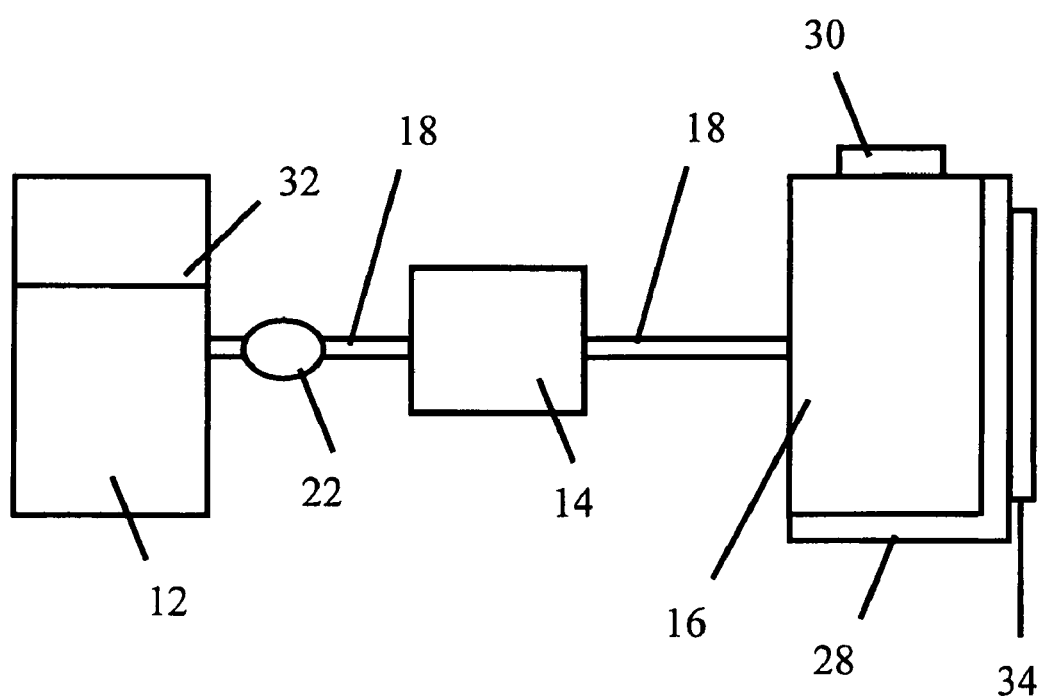
FIG. 3 is a schematic representation of an electrical power generator having a conduit connecting each of the water vapor generator, the hydrogen gas generator and the fuel cell, and also having a pump, a tensile membrane within the water vapor generator and a thermal insulator around the fuel cell.

A seen in FIGS. 1-3, the electrical power generator 10 broadly comprises at least one water vapor generator 12, at least one hydrogen gas generator 14 attached to the water vapor generator 12 and a fuel cell 16 attached to the hydrogen gas generator 14. The water vapor generator 12 is preferably a chamber that is at least partially filled with water in the form of either water vapor, liquid water or ice. The quantity of either liquid water or ice may vary and generally depends on the size of the water vapor generating chamber 12 and the application for which the power generator 10 is used. Should any liquid water be present within the water vapor generator 12, the liquid water may be prevented from seeping out of the water vapor generator 12 by either porous plugs 24 or by a valve 26. Porous plugs 24 comprise a porous material such as cotton or a polymeric fabric, which acts as a barrier to liquid water while allowing the passage of water vapor into and out of the water vapor generator 12.

Alternately, valve 26, may regulate the passage of water vapor out of the water vapor generator 12 and prevent the seeping out of any liquid water. This embodiment is shown in FIG. 2. The valve 26 may be either a manually or electrically controlled valve. If the valve is controlled electrically, the initial power necessary to open the valve, causing an initial flow of water vapor from the water vapor generator 12 to the hydrogen gas generator 14, is preferably supplied by power stored in a device 30. The valve 26 may be directly electrically connected to the device 30 or to the fuel cell 16, with the fuel cell then being electrically connected to the device 30. The device 30 may alternately be attached to either the water vapor generator 12, the hydrogen gas generator 14 or another element of the power generator 10. Once the valve 26 is initially opened to allow water vapor out of the water vapor generator 12, the power generated from the fuel cell 16 is then preferably used to supply the power for controlling the valve 26. In the preferred embodiment of the invention, the device 30 comprises a battery. The opening and closing of the valve 26 is preferably controlled externally depending on when it s desired to generate hydrogen gas and fuel the fuel cell.

In another embodiment, the power generator 10 is initially loaded with hydrogen gas within at least one of said water vapor generator 12, hydrogen gas generator 14, fuel cell 16 and said optional conduits 18 or return line 20. This initial loading of hydrogen gas will travel to the fuel cell 16, causing a reaction with oxygen gas within the fuel cell, and generating electricity. This electricity is then used to power the valve 26. While valve 26 is only depicted in FIG. 2, it is intended that any embodiment of the present invention may include at least one valve 26.

The dimensions of the water vapor generator 12 are preferably very small in scale, but may also vary with respect to the use of the power generator 10. In preferred small scale embodiments, the water vapor generator 12 is preferably from about 0.1 cm to about 1.0 cm in height, from about 0.1 cm to about 1.0 cm in width and from about 0.1 cm to about 1.0 cm in length. As seen in FIG. 3, optionally within the water vapor generator is a tensile membrane 32. The tensile membrane 32 acts to exert pressure on water vapor within the water vapor generator 12 forcing the water vapor out of the water vapor generator 12 and toward the hydrogen gas generator 14. The pressure within the water vapor generator 12 is preferably maintained at a pressure of slightly more than atmospheric pressure. Attached to the water vapor generator 12 is a hydrogen gas generator 14. The hydrogen gas generator 14 is preferably in the form of a chamber and is at least partially filled with a substantially non-fluid substance which reacts with water vapor to generate hydrogen gas. Alternately, the hydrogen gas generator 14 may be an open area adjacent to the water vapor generator 12 suitable for retaining the non-fluid substance. Similar to the water vapor generator 12, the dimensions of the hydrogen gas generator 14 will vary depending on the proposed use of the power generator 10. When the hydrogen gas generator 14 comprises a chamber in a small scale application, it is preferably from about 0.1 cm to about 1.0 cm in height, from about 0.1 cm to about 1.0 cm in width and from about 0.1 cm to about 1.0 cm in length.

The substantially non-fluid substance within the hydrogen gas generator 14 preferably comprises a material in powder, granule or pellet form and is preferably an alkali metal, calcium hydride, lithium hydride, lithium aluminum hydride, sodium borohydride and combinations thereof. Suitable alkali metals non-exclusively include lithium, sodium and potassium. The preferred material for the non-fluid substance is sodium borohydride. The non-fluid substance is also preferably combined with a hydrogen generation catalyst to catalyze the reaction of the water vapor and the non-fluid substance. Suitable catalysts include non-exclusively include cobalt, nickel, ruthenium, magnesium and alloys and combinations thereof.

Attached to the hydrogen gas generator 14 is a fuel cell 16. Hydrogen powered fuel cells are well known in the art. The dimensions of the fuel cell 16 also depend on the intended use of the power generator 10. In small scale applications, the fuel cell is preferably from about 0.1 cm to about 1.0 cm in height, from about 0.1 cm to about 1.0 cm in width and from about 0.1 cm to about 1.0 cm in length. As seen in FIG. 3, it is preferred that the fuel cell 16 is at least partially surrounded by a thermal insulator 28. The thermal insulator 28 may comprise anything suitable to maintain the fuel cell above the freezing temperature of water. Suitable thermal insulators non-exclusively include insulators comprising a plastic foam. In addition to the thermal insulator, a heater 34 may be placed adjacent to or attached to the fuel cell 16 to maintain the temperature of the fuel cell and power generator 10 above the freezing temperature of water. In the preferred embodiment of the invention, the power generator 10 will be maintained at a temperature of from about −20° C. to about 50° C., more preferably from about 0° C. to about 50° C. and most preferably from about 20° C. to about 50° C. while in use.

As seen in FIGS. 1 and 3, the water vapor generator 12 is preferably connected to the hydrogen generator 14 via at least one conduit 18, and the hydrogen generator 14 is preferably connected to the fuel cell 16 via at least one conduit 18. The conduits 18 may comprise anything sufficient to facilitate the transport of water vapor from the water vapor generator 12 to the hydrogen generator 14 and hydrogen gas from the hydrogen generator 14 to the fuel cell 16. As seen in FIG. 1, in the preferred embodiment of the invention, the power generator 10 also includes a return line 20 that directs any residual water vapor and hydrogen gas from the fuel cell 16 back to the water vapor generator 12. The return line 20 is preferably substantially identical to conduits 18. As shown in FIG. 2, neither the conduits 18 nor the return line 20 are necessary elements for the efficient performance of the invention. In this embodiment, the water vapor generator 12 may be directly attached to the hydrogen gas generator 14 and the fuel cell 16 directly attached to the hydrogen gas generator 14.

It is further preferred that at least one pump 22 is coupled with the power generator 10 to pump hydrogen gas and water vapor between the water vapor generator 12 and the hydrogen gas generator 14. The pump 22 is preferably electrically connected to and powered by the fuel cell 16, with the pump optionally being powered initially by power stored in device 30. It is also preferred that an inert gas is initially present within the water vapor generator 12, hydrogen gas generator 14, fuel cell 16 and in the optional conduits 18 and optional return line 20. The inert gas assists in transporting water vapor and hydrogen gas to the fuel cell 16 and is preferably a gas selected from the group consisting of nitrogen, argon, combinations thereof and the like.

In use, the water vapor generator 12 may generate water vapor in a variety of ways, such as by evaporation of liquid water from the water vapor generator 12, by diffusion of water molecules into the air, by bubbling gas through the water, or by passing gas over the surface of the liquid water or the ice if present or over surfaces wetted by the water. Once the water vapor is generated it is directed from the water vapor generator 12 toward the hydrogen gas generator 16 either via diffusion, via pressure exerted by tensile membrane 32, via a force generated by pump 22, by a flow induced as water vapor is consumed in the hydrogen generator, or by flow induced as hydrogen is consumed by the fuel cell. The water vapor then passes through either the porous plugs 24 or open valve 26, preferably into conduit 18 and then to the hydrogen gas generator 14 which is at least partially filled with the substantially non-fluid substance. Once the water vapor passes into the hydrogen gas generator 16, the substantially non-fluid substance reacts with the water vapor, consuming water vapor to generate hydrogen gas. The hydrogen gas and any residual water vapor is then directed from the hydrogen gas generator 14 to the fuel cell 1, preferably via another conduit 18. Once the hydrogen gas reaches the fuel cell, the hydrogen gas is reacted with oxygen gas within the fuel cell, consuming the hydrogen gas to generate electricity. Subsequently, any residual water vapor and any residual hydrogen gas are transported from the fuel cell 16 back to the water vapor generator 12, preferably via a return line 20.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

The invention claimed is:

1. An electrical power generator comprising:
   a water vapor generator for generating water vapor at a temperature of from about −20° C. to about 50° C.;
   a hydrogen gas generator attached to the water vapor generator, said hydrogen generator containing a substantially non-fluid substance which reacts with water vapor to generate hydrogen gas; said hydrogen generator optionally being attached to said water vapor generator via at least one conduit to avoid reaction of the fuel with liquid water;
   a fuel cell attached to the hydrogen gas generator; said fuel cell optionally being attached to said hydrogen gas generator via at least one conduit;
   at least one manually or electrically controllable valve for regulating the passage of hydrogen gas and water vapor between the water vapor generator and the fuel cell; and
   a porous plug adjacent to said water vapor generator, said plug acting as a barrier for impeding the flow of liquid water from said water vapor generator and substantially allowing the flow of hydrogen gas and water vapor into and out of said water vapor generator.

2. The electrical power generator of claim 1, wherein the water vapor generator and the hydrogen gas generator are adapted to provide sufficient hydrogen for desired operation of the fuel cell.

3. The power generator of claim 1 further comprising a return line which directs residual water vapor and hydrogen gas from the fuel cell to the water vapor generator.

4. The power generator of claim 1 wherein the water vapor generator comprises a chamber at least partially filled with water vapor.

5. The power generator of claim 1 wherein the water vapor generator is at least partially filled with ice.

6. The power generator of claim 1 wherein the hydrogen gas generator comprises a chamber at least partially filled with a substantially non-fluid substance which reacts with water vapor to generate hydrogen gas.

7. The power generator of claim 1 further comprising hydrogen gas initially loaded within at least one of said water vapor generator, hydrogen gas generator, fuel cell and said optional conduits.

8. The power generator of claim 1 further comprising at least one device attached to at least one of said water vapor generator, said hydrogen generator or said fuel cell for causing an initial flow of water vapor from the water vapor generator to the hydrogen gas generator.

9. The power generator of claim 1 wherein said substantially non-fluid substance comprises a material selected from the group consisting of alkali metals, calcium hydride, lithium hydride, lithium aluminum hydride, sodium borohydride and combinations thereof.

10. The power generator of claim 1 wherein said substantially non-fluid substance comprises sodium borohydride.

11. The power generator of claim 1 further comprising a hydrogen generation catalyst combined with said substantially non-fluid substance.

12. The power generator of claim 11 wherein said catalyst is selected from the group consisting of cobalt, nickel, ruthenium and alloys and combinations thereof.

13. The power generator of claim 1 further comprising at least one pump for pumping hydrogen gas and water vapor between the water vapor generator and the fuel cell.

14. The power generator of claim 1 wherein said substantially non-fluid substance is in powder, granule or pellet form.

15. The power generator of claim 1 wherein said fuel cell is at least partially surrounded by a thermal insulator.

16. The power generator of claim 1 further comprising a heater adjacent to the fuel cell.

17. The power generator of claim 1 further comprising a tensile membrane within the water vapor generator which exerts pressure directing water vapor from the water vapor generator to the hydrogen gas generator.

* * * * *